United States Patent [19]

Volk

[11] 4,421,053
[45] Dec. 20, 1983

[54] TWO-STAGE POP UP THERMOMETER

[76] Inventor: Anthony J. Volk, P.O. Box 943, Turlock, Calif. 95380

[21] Appl. No.: 331,985

[22] Filed: Dec. 18, 1981

[51] Int. Cl.³ ............................................. G01K 11/06
[52] U.S. Cl. ..................................... 116/218; 374/155
[58] Field of Search ............... 374/155, 160; 116/217, 116/218; 99/342

[56] References Cited

U.S. PATENT DOCUMENTS

| | | | |
|---|---|---|---|
| 945,978 | 1/1910 | Nielsen et al. | 116/218 |
| 1,387,890 | 8/1921 | Kleidman | 116/218 |
| 2,677,278 | 5/1954 | Smith et al. | 374/160 X |
| 3,140,611 | 7/1964 | Kliewer | 374/155 X |
| 3,280,629 | 10/1966 | Kliewer | 116/218 |
| 3,479,876 | 11/1969 | Kliewer | 374/155 X |
| 3,548,780 | 12/1970 | Kliewer | 116/217 |
| 3,559,615 | 2/1971 | Kliewer | 116/217 |
| 3,626,897 | 12/1971 | Kliewer | 116/218 |
| 3,656,452 | 4/1972 | Kliewer | 116/217 |
| 3,682,130 | 8/1972 | Jeffers | 116/218 |
| 3,693,579 | 9/1972 | Kliewer | 116/218 |
| 3,811,402 | 5/1974 | Kelley | 116/217 |
| 3,965,849 | 6/1976 | Gee | 116/217 |
| 4,170,956 | 10/1979 | Wear | 116/218 |

Primary Examiner—Daniel M. Yasich
Attorney, Agent, or Firm—Alvin E. Hendricson

[57] ABSTRACT

A disposable cooking thermometer has a hollow barrel with a neck therein containing a stem that is spring loaded to move out of an open upper end of the barrel and is held within the barrel by a fusable material about an inner stem end in spaced relation below the barrel neck and about an internal barrel projection below the neck so that initial softening of the fusable material releases the stem to move a first predetermined distance whereat the material engages the barrel underneath the neck until the material melts to release the stem to move a second predetermined distance.

9 Claims, 7 Drawing Figures

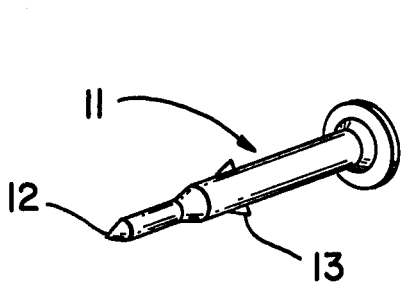
FIG _ 1
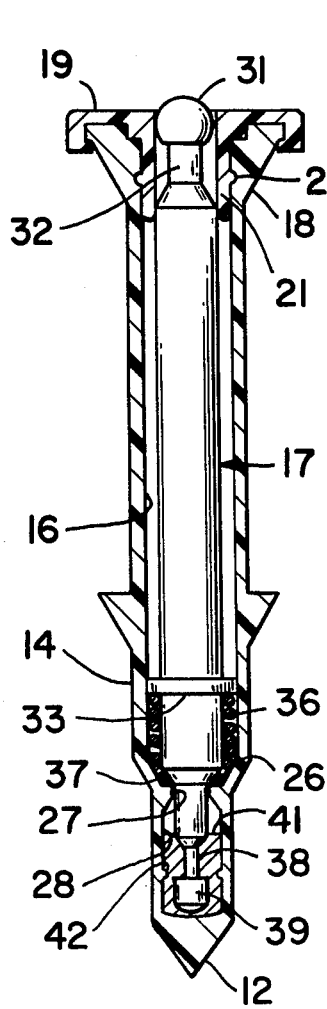
FIG _ 2
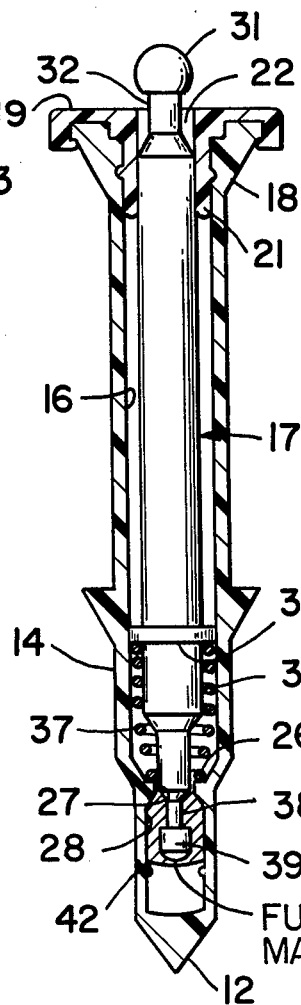
FIG _ 3
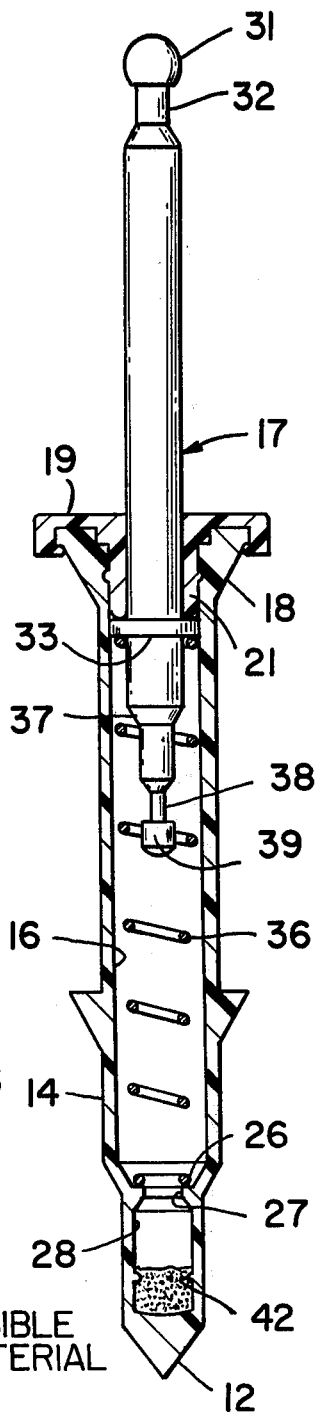
FIG _ 4

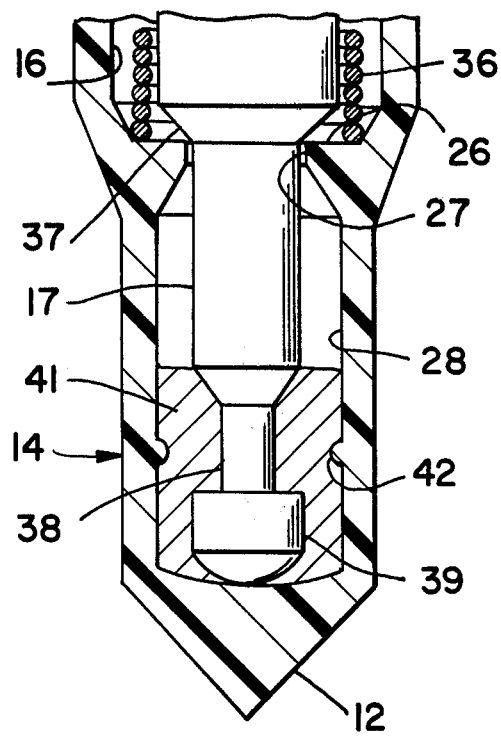
FIG_5
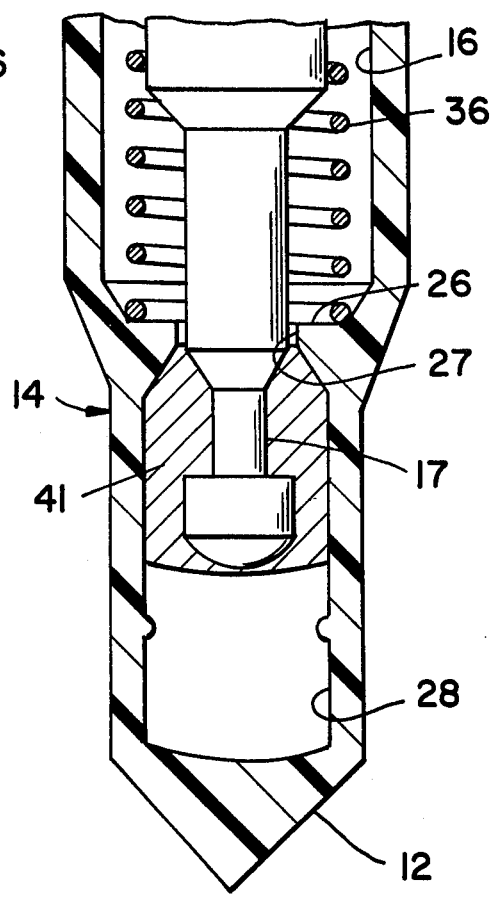
FIG_6
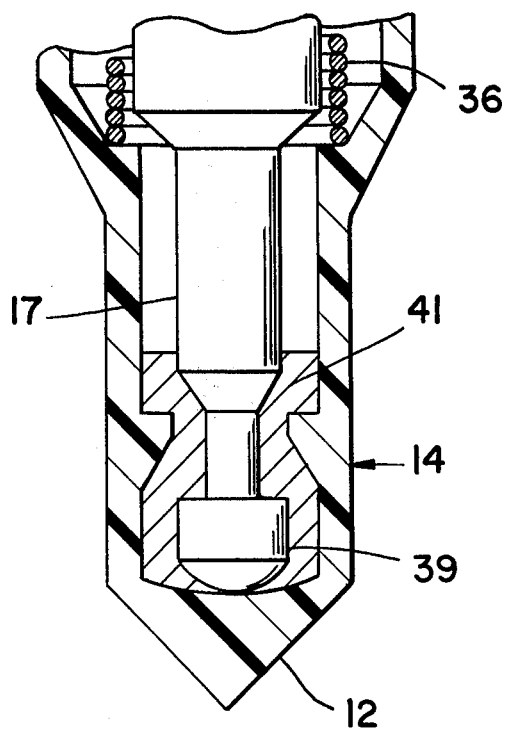
FIG_7

TWO-STAGE POP UP THERMOMETER

BACKGROUND OF INVENTION

Disposable meat and poultry thermometers commonly include an indicator stem that is movable in an elongated barrel adapted to be inserted in the meat or the like. Various types of fusable materials which soften or fuse at predetermined temperatures are employed to lock or latch the indicator stem against the force of a spring so that softening or liquifying of the material allows the spring to move the stem as an indication of a predetermined meat temperature.

The indicator stem may be moved into or out of the barrel by the spring and the latter, called "pop-up" thermometers release the stem at a predetermined temperature so that the stem pops or jumps partially out of the barrel as a temperature indicator. The inwardly moving stem thermometers normally provide a more gradual stem movement into the barrel and timing marks may be made on the indicator stem to indicate the time remaining until a predetermined cooking temperature or doneness is reached.

Many types of fusible latching mechanisms for pop-up thermometers have been devised, with one of the more common comprising a fusable pin or the like extending through a transverse opening in the stem or into a lateral depression in the stem from a lateral depression in the interior of the barrel. Softening of the pin at increased temperature releases the stem for movement by a spring. Many of these structures are quite complex, such as multistem devices, and the very nature of the latching mechanisms give rise to the possibility of malfunction while limiting the indication to a sudden change from "undone" to "done".

The present invention provides an improved stem release structure for a pop-up thermometer operable to allow stem movement in separate stages to a first partially extended position at a first temperature and to a second further extended position at a predetermined higher temperature.

SUMMARY OF INVENTION

The present invention provides a disposable cooking thermometer for meat, poultry, or the like as a thin, elongated barrel adapted to be inserted in meat, for example, and having an indicator stem therein urged by an internal spring to move out of the rear end of the barrel. The stem has a reduced cross-section adjacent and spaced from the inner end thereof and the barrel has an internal cavity separated from the remainder of the interior thereof by a neck of reduced cross-section. The barrel also has one or more lateral projections into the barrel cavity spaced from the neck. A fusible material is disposed in the cavity about the stem end and reduced cross-section for engaging stem and barrel projections to lock the stem within the barrel.

Heating of the thermometer hereof to a predetermined temperature will cause initial softening of the fusible material at the contact thereof with the barrel so that the stem and the fusible material yet attached thereto is freed to move via spring pressure longitudinally of the barrel away from the inner end thereof until the fusible material engages the neck in the barrel. This then positions the stem with a portion of the outer end extending from the barrel. Further heating of the thermometer to substantially completely melt the fusible material releases the stem to move under spring pressure to extend a substantial distance from the end of the barrel.

The present invention will thus be seen to provide a disposable cooking thermometer of the pop-up type wherein an indicator stem first pops up a short distance at a predetermined thermometer temperature for indicating a limited period of time until a final desired temperature is reached. As this final desired temperature is reached, the stem pops up further to indicate that the meat or the like in which the thermometer is inserted has been cooked to the desired degree. The present invention thus actually indicates a first temperature of meat, poultry or the like during cooking and a second subsequent temperature thereof. This is highly advantageous in providing substantial information to a cook or chef.

The physical structure of the present invention may also be employed with only minor modification to provide a single stage pop up thermometer for those circumstances or users requiring same.

DESCRIPTION OF FIGURES

The present invention is illustrated as to particular preferred embodiments in the accompanying drawings, wherein:

FIG. 1 is a perspective view of a disposable cooking thermometer in accordance with the present invention;

FIG. 2 is a central vertical sectional view of the thermometer in FIG. 1;

FIGS. 3 and 4 are sectional views taken in the same plane as FIG. 2 and illustrating the thermometer in successive stages of operation;

FIG. 5 is a greatly enlarged partial longitudinal central, sectional view of the bottom end of the thermometer of FIG. 1;

FIG. 6 is a sectional view like FIG. 5 and illustrating the bottom stem end in intermediate position: and FIG. 7 is a sectional view like FIG. 5 illustrating a modification of the present invention.

DESCRIPTION OF PREFERRED EMBODIMENTS

The present invention provides a disposable thermometer or temperature indicator for use in cooking of meat, poultry and the like. The present thermometer is of the pop-up type wherein an indicator stem moves longitudinally out of the open end of a barrel adapted to be inserted in meat or the like for indicating that the meat, for example, has been cooked to a desired degree. The present invention furthermore provides a double pop-up action wherein the indicator stem initially moves a limited distance from the barrel end to indicate that the meat or the like is almost completely cooked and then subsequently moves a substantial distance out of the barrel to indicate that the meat is cooked to the desired degree. Basically, the thermometer operates by providing a spring about the indicator stem within the barrel for urging the stem out of the open end of the barrel and locking this stem within the barrel by a fusible material which melts at a predetermined temperature. This general type of thermometer is well known in the art as evidenced by the large number of patents that have issued on various structures relative thereto. The present invention provides a specific improvement in this type of thermometer in the manner of locking the indicator stem and the manner of release of the stem, particularly, in successive stages wherein the stem pops into partially extended position and subsequently pops further up to a completely extended position.

Referring now to the drawings there will be seen to be illustrated in FIG. 1 a disposable cooking thermometer having a size, as illustrated, of about 2 inches long and about ¼ inch in diameter. A pointed or inner end 12 of the thermometer is provided to assist in inserting the thermometer in meat, poultry or the like that is to be timed in cooking by the present invention. Exterior laterally extending fins or barbs 13 may be provided, as indicated, to hold the thermometer in the meat or the like during cooking.

Referring now to FIG. 2 of the drawings, there will be seen to be provided a generally cylindrical barrel 14, having a cylindrical bore 16 extending from an open upper or rear end of the barrel into close proximity with the forward, pointed end of the barrel. Within this barrel opening there is provided an indicator stem 17 which has a length substantially equal to the central bore or opening 16 in the barrel, so as to fit substantially entirely therein, as indicated. At the top or rear end of the barrel there is provided a flange 18 thereabout and a closure member 19 is disposed on this flange with a depending hollow cylindrical portion 21 fitting into the open end of the barrel to define a central axial opening 22 for extension of the stem 17 therethrough. The closure member or cap 19 is arranged for double locking engagement with the barrel flange and top. A circular cap portion 23 snaps into a mating groove about the bore 16 of the barrel 14 as an internal lock and a depending rim about the cap fits over and extends under the barrel flange 18 as an external lock. This structure ensures a positive and permanent joinder of cap and barrel.

Internally of the barrel 14 and adjacent the inner end thereof there is provided a shoulder 26 which may, in part, taper outwardly to the full bore diameter. Within the barrel and immediately below the shoulder 26 there is provided a neck portion 27 having an opening of reduced diameter therethrough and below which the bore tapers outwardly to a cavity 28 at the forward or inner end of the barrel adjacent the point 12. This cavity is further described below, particularly with regard to operation of the present invention.

Considering now the stem 17 of the present invention it is noted that same is generally formed as an elongated cylinder having a diameter substantially equal to that of the opening 22 in the cap 19 at the open end of the barrel to slidably move in such opening. At the upper or outer end of the stem 17 there is shown to be provided a ball 31 having a reduced stem diameter 32 extending a short distance to the full diameter stem, as illustrated. It will be noted that the stem diameter is less than the diameter of the bore 16 of the barrel and a flange 33 is disposed about the stem above the shoulder 26 in the bore with a flange diameter substantially equal to that of the bore so as to be slidably disposed therein. Beneath the flange 33 and compressed against the shoulder 26 is a spring 36 which will be seen to resiliently urge the stem longitudinally out of the rear of the barrel. The stem is additionally provided at a distance below the flange 33 with a tapered portion 37 adapted to seat on the inner edge of the shoulder 26 in order to close off the bore 16 below the shoulder from the bore portion above the shoulder. Below the tapered stem portion 37 the stem extends downwardly into the cavity 28 and therein tapers inwardly to a narrow stem portion 38 extending to an expanded stem end 39 which may have the same diameter as the stem above the narrow portion 38.

The present invention provides a pop-up action in a disposable cooking thermometer; however, there is also provided herein a particular improved operating structure which is specifically related to the physical layout of the inner end or lower portion of the barrel and indicator stem of the present invention. In this respect reference is made to FIG. 5 illustrating in greatly enlarged form the lower cavity 28 in the barrel and the lower end of the stem 17. It is first noted that the present invention employs a fusible material 41 which melts at a predetermined temperature. Numerous materials of this type are known in the art and, for example, "Woods metal" has long been employed in automatic sprinkling systems to melt and actuate a sprinkler upon the melting of the material at a predetermined temperature. In the field of disposable cooking thermometers it has long been known to employ certain combinations of metals which are readily formulated to have a predetermined melting temperature and, in fact, certain organic materials have also been developed for the same purpose. The "fusible material" of the present invention is one of the foregoing materials which has a predetermined melting temperature such as 182° to 184°, for example. This material is deposited in liquid form about the bottom end of the stem 17 within the lower portion of the cavity 28 at the bottom of the barrel 14. In the embodiment of the present invention illustrated in FIG. 5 there is also provided in the cavity 28 one or more internal projections 42 disposed above the bottom of the cavity and above the enlarged end 39 of the stem 17, but within the material 41 solidified about the lower portion of the stem and engaging the walls of the cavity 28. The level of the material 41 in this embodiment of the present invention normally rises about to the top of the reduced diameter 38 of the stem above the enlarged end 39 thereof and is solidified in the manner illustrated to thus firmly lock the stem in the position shown, i.e., substantially entirely within the barrel 14.

Operation of the present invention provides for inserting the thermometer hereof into meat, poultry or the like which is to be timed for cooking to a predetermined "doneness". Considering as an example the cooking of a turkey, it is generally considered that a tom turkey is fully cooked when the deepest part of the meat thereof has been raised to a temperature of 182° to 184° F. Normally, the thickest part of the meat of a turkey may be found on the breast or possibly the thigh and thus the thermometer 11 is inserted by the point 12 into the meat at the thickest point until the top 19 rests against the surface of the meat. The turkey is then cooked and in the above-noted example, a temperature approaching that of "doneness" will first soften the fusible material 41 about the outer edge thereof engaging the interior of the barrel 14. The internal projection(s) 42, which may for example be formed as a ring about the interior of the cavity 28 and having a depth of the order of a few thousandths of an inch will initially prevent the block of material 41 and enclosed stem 17 from moving in the cavity 28 until such exterior softening of the material 41 allows the material to slide over this projection 42. In the present example this will occur at about 170° F. and will allow the stem under pressure from the spring 36 to be moved upwardly along with the material 41 attached thereto until this material 41 engages the underside of the neck 27. It is particularly noted in this respect that the lower or inner end of the stem 17 is enlarged or incorporates lateral projections, as indicated at 39, so that the block of material 41 cannot slide off of the stem to free the stem for upward movement until substantially all of the material 41 is melted. This bottom lateral projection 39 of the stem 17 may, as indicated, comprise a ball or the like or, alternatively may comprise lateral fins, flanges or whatever merely to prevent a loosening of the stem in the material 41 and release of the stem before substantially all of the material 41 is melted. The spring 36 is at all times urging the stem upwardly out of the barrel and initially the softening of the material 41 about the periphery thereof will allow the material and attached stem to be moved upwardly past the internal projections 42 until the material engages the tapered underside of the neck 27. This will then cause the stem 17 to move out of the barrel, as indicated in FIG. 3 of the drawings so that the head 31 of the stem is fully visible, as an indication to the cook or the chef that only a limited period of time remains to complete cooking of the meat, poultry or the like within which the present invention is inserted. This initial movement may be of the order of ¼ of an inch, although of course other dimensions are possible.

After the initial "pop-up" of the stem 17 described above, the thermometer will remain in the first indicating position as also described above, until the fusible material 41 substantially completely melts. At this temperature of substantially complete melting of the material 41 the stem is then completely released to move upwardly through the neck 27 and the stem 17 then moves very substantially out of the barrel, as indicated in FIG. 4 until the flange 39 on the stem engages the underside of the cylindrical projection 21 on the cap 19. The stem 17 has a diameter that is only slightly less than that of the opening in the neck 27 and this is preferably also true of the lateral projection 39 on the bottom of the stem. This is provided for the purpose of allowing the stem to readily move through the neck 27 but to seriously preclude any possible movement of the stem upwardly until the material 41 has in fact substantially completely melted. This final melting temperature may, for example, be of the order of 182° to 184° F., which has been determined by substantial research to provide for full cooking of a turkey of substantial size. Obviously, entirely alternative temperatures may be provided by the preselection of appropriate fusible materials for cooking of roast beef, for example, wherein it may be desired to have the interior thereof either rare, medium rare, or well done. At any rate, it is possible by the present invention to apprise the one cooking the meat or poutry of a period of time remaining for completion of cooking. In the instance chosen above, a period of time of about ½ hour elapses between the initial "pop-up" of the stem 17 and the final "pop-up" of the stem 17. This then allows the cook or chef to perform other operations that may be advantageous in completing a meal that is associated with cooking of the turkey, in this instance.

The present invention provides a truly two-stage pop-up thermometer for the cooking of poultry, meats or the like, wherein the disposable thermometer hereof first rises to an intermediate position to indicate a predetermined time remaining before the cooking is completed and then rises very substantially further to identify the fact that cooking has been completed. FIGS. 5 and 6 illustrate the initial position of the bottom end of the stem of the thermometer hereof and the intermediate position of this indicator stem while FIGS. 1 and 2 indicate the relative position of the outer end of the indicator stem as between these two positions. FIG. 4 hereof illustrates the ultimate extended position of the stem identifying completion of cooking.

The present invention may also be arranged to provide only a single pop or movement of the indicator stem if desired for particular applications. In this respect reference is made to FIG. 7 illustrating a structure of the present invention employing the identical indicator stem and a substantially identical barrel but without the small internal projection or projections 42 in the cavity 28. In this arrangement the fusible material 41 is provided in a somewhat greater amount to thus extend from the bottom of the cavity 28 up into the neck or at least the tapered portion of the neck 27. It will be seen that the fusible material 41 will thus hold the indicator stem in fully retracted position within the barrel 14 until the fusible material softens enough beneath the taper of the neck to allow a slight upward movement of the stem and subsequently melts at its predetermined melting temperature so as to release the stem 17 so that it may be urged upwardly and outwardly of the end of the barrel 14 under the force of the spring 36.

It is to be particularly noted that the indicator stem of the present invention seals the bore or central opening of the barrel 14 below the neck 27 by seating of the taper portion of the stem on the rim of the neck 27. This prevents any possibility of fusible material 41 engaging the spring 36 for it is not intended herein to lock the thermometer by engagement of fusible material with the spring. Quite to the contrary, the structure of the indicator stem and barrel cavity is such that locking and release is accomplished solely by engagement of fusible material with the latter.

It will be apparent to those skilled in the art that numerous modifications and variations of the present invention may be made within the spirit and scope of the present invention and thus it is not intended to limit the invention to precise terms of description or details of illustration.

What is claimed is:

1. An improved disposable cooking thermometer comprising
   an elongated barrel having a central longitudinal bore with an open rear end and a closed front end,
   said barrel having a reduced interior cross-section adjacent the front end thereof forming a neck separating a front internal cavity from the remainder of the bore with said neck having a lesser cross-sectional opening than said bore and cavity and said neck tapering laterally outwardly to said cavity,
   an elongated indicator stem having a flange and slidably disposed substantially entirely within said barrel and having a first reduced stem portion below said flange and a second reduced stem portion below said first stem portion and terminating in an enlarged portion at an inner stem end that is disposed entirely within said cavity abutting the inner end thereof,
   a spring within said barrel engaging said flange on said stem and an internal shoulder for urging said stem from the rear end thereof, and
   a fusible material having a predetermined melting temperature disposed in said barrel cavity about said inner stem end and the second reduced cross-section of said stem for holding said stem in said barrel until said fusible material reaches a predetermined temperature whereat said stem is extended from the rear end of the barrel.

2. The thermometer of claim 1 further defined by said neck having an opening therethrough slidably passing said stem extending therefrom to the inner end of said cavity, and said barrel having at least one lateral projection into said cavity extending short of said stem and about which said fusible material is disposed.

3. The thermometer of claim 2 further defined by said fusible material being disposed about said stem in filling relation to said cavity to a level spaced from said neck a predetermined distance which said stem can move upon softening of said material to release from said lateral projection in said cavity as a first stem movement followed by a further stem movement upon melting of said material to allow the inner stem end to move through said neck.

4. The thermometer of claim 3 further defined by said lateral projection in said barrel cavity comprising a thin ring about said cavity in spaced relation to the inner end of the cavity.

5. The thermometer of claim 1 further defined by
a closure member about the open barrel end with a hollow cylindrical projection extending into said barrel and slidably engaging said stem,
said stem having a length substantially equal to the length of the barrel bore and cavity and having said flange thereabout disposed in spaced relation above the neck in said barrel with said stem fully inserted in said barrel and said stem flange slidably engaging said barrel opening for aligning said stem and barrel axially during stem movement.

6. The thermometer of claim 5 further defined by said neck in said barrel defining an annular shoulder above said neck and said spring being disposed in compression between said shoulder and said stem flange.

7. The thermometer of claim 1 further defined by said stem having a length substantially equal to the length of said barrel opening and normally disposed substantially therein with a tapered section engaging the inner edge of said neck for separating fusible material in said cavity from said barrel opening above said neck whereat said spring is disposed.

8. The thermometer of claim 1 further defined by
said second reduced cross-section of said stem extending through said neck with said stem abutting the inner end of said cavity, and
said fusible material filling said cavity about said stem end and extending through said neck about said reduced cross-section of said stem at least to the top of said reduced cross-section above said neck.

9. An improved disposable cooking thermometer comprising
an elongated barrel having a cylindrical opening extending substantially therethrough longitudinally thereof from an open rear end to a closed front end with said barrel having an interior portion of reduced opening therein adjacent the front end for defining a neck having an annular shoulder above same and separating a front internal cavity from the remainder of the barrel interior, and said barrel having at least one projection extending laterally into said cavity,
an elongated indicator stem having a length substantially equal to the length of the barrel opening disposed substantially entirely within said barrel with an inner end in said cavity and having a lateral flange thereabout in spaced relation above the neck in said barrel with the stem fully inserted in said barrel and said stem flange slidably engaging said barrel opening for aligning stem and barrel axially during stem movement, a first reduced stem portion below said flange and a second reduced stem portion below said first stem portion and terminating in an enlarged portion,
a closure member about the open barrel end with a hollow cylindrical projection extending into said barrel and slidably engaging said stem extending therethrough,
a spring disposed within said barrel in compression between said shoulder and said stem flange for slidably urging said stem from the open rear end of said barrel, and
a fusible material having a predetermined melting temperature disposed about said stem and said lateral projection in said cavity in filling relation to said cavity to a level spaced from said neck a predetermined distance which is substantially the distance said stem can move upon softening of said material to release from said lateral projection in said cavity as a first stem movement followed by a further stem movement upon melting of said material at said predetermined temperature to allow said inner stem end to move through said neck.

* * * * *